(12) United States Patent
Johnson (10) Patent No.: US 11,507,341 B1
(45) Date of Patent: Nov. 22, 2022

(54) VOICEOVER DEVICE

(71) Applicant: L.J. Avalon, LLC., Tampa, FL (US)

(72) Inventor: Lahnie Johnson, Tampa, FL (US)

(73) Assignee: L.J. Avalon LLC., Tampa, FL (US)

( * ) Notice: Subject to any disclaimer, the term of this patent is extended or adjusted under 35 U.S.C. 154(b) by 0 days.

(21) Appl. No.: 17/242,695

(22) Filed: Apr. 28, 2021

Related U.S. Application Data (60) Provisional application No. 63/016,602, filed on Apr. 28, 2020.

(51) Int. Cl.
*H04R 3/00* (2006.01)
*G06F 3/16* (2006.01)
*H04R 1/08* (2006.01)
*H04R 1/40* (2006.01)

(52) U.S. Cl.
CPC ............... *G06F 3/165* (2013.01); *H04R 1/08* (2013.01); *H04R 1/406* (2013.01); *H04R 3/005* (2013.01); *H04R 2430/01* (2013.01)

(58) Field of Classification Search
CPC ........... G06F 3/165; H04R 1/08; H04R 1/406; H04R 3/005; H04R 2430/01
USPC .......................................................... 381/92
See application file for complete search history.

(56) References Cited

U.S. PATENT DOCUMENTS

| | | | | |
|---|---|---|---|---|
| 7,035,796 | B1 * | 4/2006 | Zhang | G10L 21/0208 704/226 |
| 2007/0048711 | A1 * | 3/2007 | Lee | G10H 1/0083 434/307 A |
| 2008/0318640 | A1 * | 12/2008 | Takano | H04R 3/005 381/369 |
| 2012/0310636 | A1 * | 12/2012 | Ookuri | G10K 11/1783 704/226 |

FOREIGN PATENT DOCUMENTS

| | | | | |
|---|---|---|---|---|
| JP | 4067210 A | * | 6/1992 | |
| JP | 4067210 B2 | * | 3/2008 | F02F 1/40 |

* cited by examiner

*Primary Examiner* — Ammar T Hamid
(74) *Attorney, Agent, or Firm* — Frijouf, Rust & Pyle P.A.

(57) ABSTRACT

A voiceover device is disclosed for use with an audio-visual device having a video display and an audio output. The voiceover device comprises an input device for receiving voiceover audio information from a user. A receiver receives the voiceover audio information of the user. A voiceover circuit is connected to the receiver for amplifying the voiceover audio information for driving a speaker. A muting circuit is connected to the receiver for muting the audio output of the audio-visual device upon the receiver receiving a voiceover audio input from the input device to substitute the voiceover audio information from the user for the original audio output of the audio-video display.

10 Claims, 9 Drawing Sheets

VOICEOVER DEVICE

CROSS-REFERENCE TO RELATED APPLICATION

This application claims benefit to provisional application 63/016,602 filed 28 Apr. 2020 which is incorporated by reference to the present application.

BACKGROUND OF THE INVENTION

Field of the Invention

This invention relates to acoustical sound and more particularly to an improved voiceover device for use with conventional audio-video display devices such as televisions and the like.

Description of the Related Art

The prior art has known various types of voiceover devices for adding audio information to an audio or a video source. Voiceover devices have been used in motion picture studios, music recording studios, television studios and the like. The voiceover devices are generally very complex and expensive in order to mix the added audio information to the original audio or video source.

One popular type of voiceover device is known under the trademark karaoke. In the karaoke device, an instrumental soundtrack is played while a text of the musical lyrics is directed to a display. An individual can sing into a microphone following the text of the musical lyrics appearing on the display. The karaoke device adds the voice of the individual singing to the instrumental soundtrack.

Although the aforementioned voiceover devices have fulfilled the menu the need of the audio visual industry, there exists a need for a low-cost and simple device enabling voiceover in a home environment. Furthermore, there is a need for a low-cost and simple device enabling voiceover to non-musical soundtracks.

Therefore it is an object of this invention to provide a voiceover device which is low-cost and may be adapted to existing audiovisual devices such as televisions and a home environment.

Another object of this invention is to provide a voiceover device for overriding the audio information of an existing audiovisual program.

Another object of this invention is to provide a voiceover device enabling multiple people to add simultaneously audio information to an existing audiovisual program.

Another object of this invention is to provide a voiceover device that is adaptable to existing audiovisual devices such as televisions without modification of the audio visual device.

Another object of this invention is to provide a voiceover device that is easy to install to existing audiovisual devices such as televisions.

Another object of this invention is to provide a voiceover device that is portable for easy transportation at different locations.

Another object of this invention is to provide a voiceover device which is capable of displaying the physical condition such as heart rate.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved voiceover device for use with an audio-visual device having a video display and an audio output. The voiceover device comprises an input device for receiving voiceover audio information from a user. The input device has a wireless input transmitter for transmitting the voiceover audio information. A receiver receives the voiceover audio information of the user from the wireless input transmitter. A voiceover circuit is connected to the receiver comprising an amplifier for amplifying the voiceover audio information for driving a speaker. A muting circuit is connected to the receiver for muting the audio output of the audio-visual device upon the receiver receiving a voiceover audio input from the input device to substitute the voiceover audio information from the user for the original audio output of the audio-video display.

In a more specific example, the audio-visual device is a television or projector display. The input device comprises a microphone receiving the voiceover audio information from the user. In the alternative, the input device comprises a microphone headset receiving the voiceover audio information from the user. Preferably, the input device comprises a plurality of microphones or a plurality of microphone headset for enabling a plurality of users to enter voiceover audio information.

The voiceover circuit includes a voice operated switch (VOX) for providing a voiceover circuit output upon receiving the voiceover audio information from the user from the wireless input transmitter. The muting circuit is connected to the receiver through a voice operated switch (VOX) the for muting the audio output of the audio-visual device upon the receiver receiving a voiceover audio input from the input device to substitute the voiceover audio information from the user for the original audio output of the audio-video display. The muting circuit includes a muting output communicating with the audio-visual device for muting the audio portion of the audio-video display device. Preferably, the muting output includes a wireless communicating with the audio-visual device. The muting output may include an electromagnetic radiation communicating with the audio-visual device.

The input device includes a heart beat sensor for monitoring the heart beat of an operator of the voiceover device. A heart beat monitor displays a heartbeat of the user.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

FIGS. 1-6 illustrate a voiceover device 5 of the present invention connected to a conventional audio-visual display 10. The audio-visual display 10 includes a video display 14 and an audio output 16. The audio-visual display 10 is equipped with a wireless remote control (not shown) for actuating a muting input 18. The muting input 18 mutes the audio output 16 and 16A from the audio-visual display 10. In this example, the audio-visual device 10 is shown as a television display but it should be understood that the audio-visual device 10 may comprise a projector, or virtually any type of audio-visual device 10.

The voiceover device 5 comprises an input device 20 for receiving voiceover audio information from a user 19. Preferably, the user 19 is shown as users 19 and 19A to be representative of a plurality of user 19. In this example, the input device 20 comprises a first microphone 21 and a second microphone 21A for the users 19 and 19A.

Figure 5:
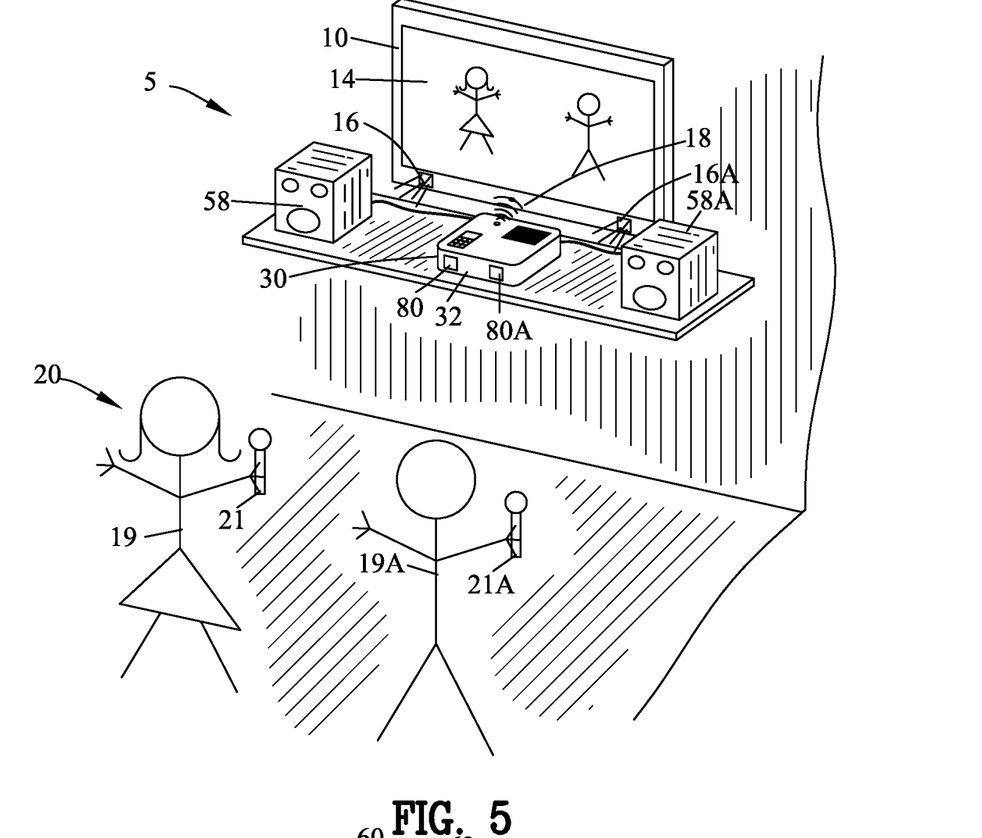
FIG. 5 is a view similar to FIG. 4 of a second microphone terminating audio information from the second player and transmitting no audio information to the voiceover device.
Figure 6:
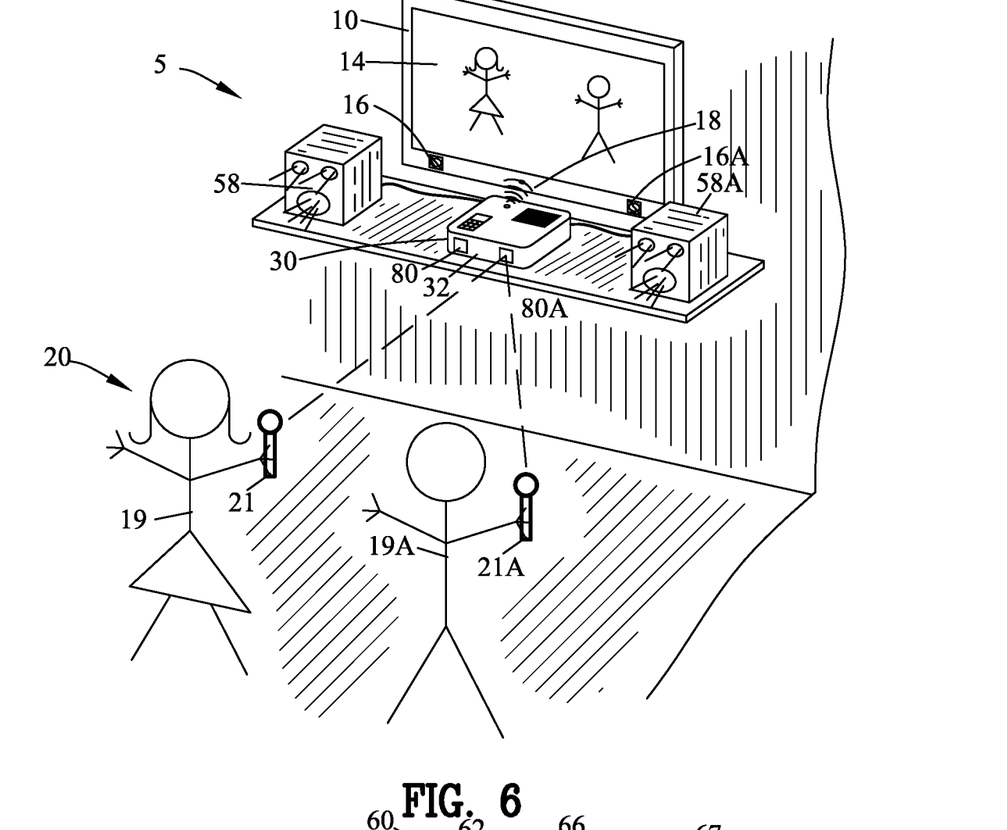
FIG. 6 is a view similar to FIG. 1 of both the first and the second microphones receiving audio information from the first and second players and transmitting the received audio information to the voiceover device.
Figure 7:
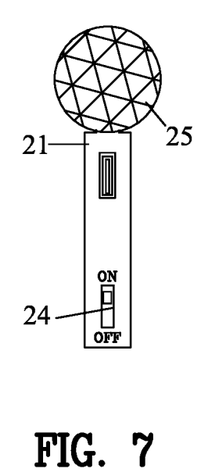
FIG. 7 is an enlarged view of the microphone of FIGS. 1-6.

FIG. 7 is an enlarged view of the microphone 21 shown in FIGS. 1-6. The microphone 21 includes an on-off switch 24 and an audio sensor 25 receiving an audio input from the user 19.

Figure 12:
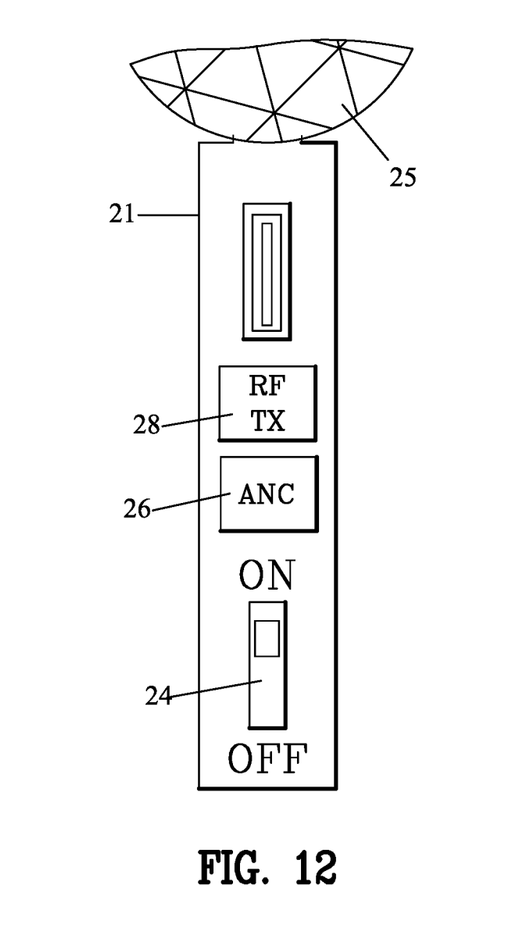
FIG. 12 is a magnified view of the microphone shown in FIG. 7.

FIG. 12 is a magnified view of the microphone 21 shown in FIG. 7. Preferably, the microphone 21 incorporates an automatic noise canceller (ANC) 26 for removing background noise from entering the audio sensor 25 of the microphone 21. The microphone 21 includes a wireless transmitter 28 for transmitting the audio information from the user 19 to a processor 30 shown in FIGS. 1-6. Preferably, the wireless transmitter 28 transmits electromagnetic radiation in the form of radio frequency transmission, ultrasonic transmission or infrared transmission.

Figure 8:
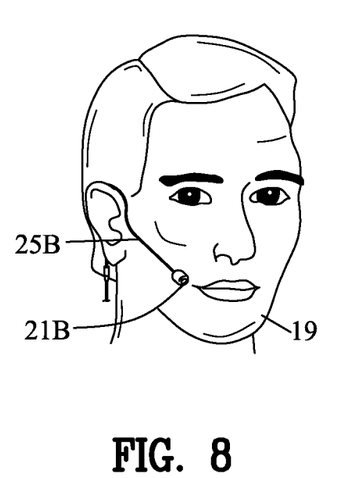
FIG. 8 is an alternate microphone suitable for use with the voiceover device of FIGS. 1-6.

FIG. 8 is an alternate microphone 21B for use with the voiceover device 5. In this example the microphone 21B comprises a headset having an audio sensor 25B. It should be appreciated by those skilled in the art that the microphone 21 they take various forms and the examples of microphones shown herein should not limit the use and application of the present invention.

Figure 9:
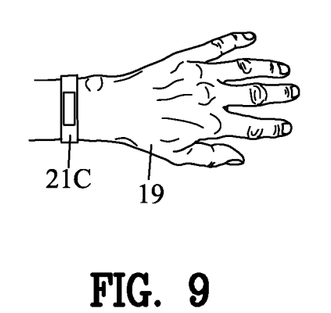
FIG. 9 is an additional input device suitable for use with the voiceover device of FIGS. 1-6.

FIG. 9 is an auxiliary input device 21C for use with the voiceover device 5. In this example, the auxiliary input device 21C comprises a human pulse sensor 25C for sensing the heartbeat of the user 19. The use and operation of the heart pulse sensor 25C will be explained in greater detail hereinafter with reference to the operation of the voiceover device 5.

Referring back to FIGS. 1-6, the processor 30 includes a receiver 40 for receiving the transmission from the wireless transmitter 28 of the microphone 21. The receiver 40 demodulates the transmission from the wireless transmitter 28 from the microphone 21 and produces an audio output 41 representative of the audio information from the user 19. The function of a receiver demodulating a carrier wave to extract modulated information as well known to those skilled in the art and need not be explained any further herein. The audio information from the audio output 41 is routed to a voiceover circuit 50, a muting circuit 60, and a controller circuit 70.

Figure 13:
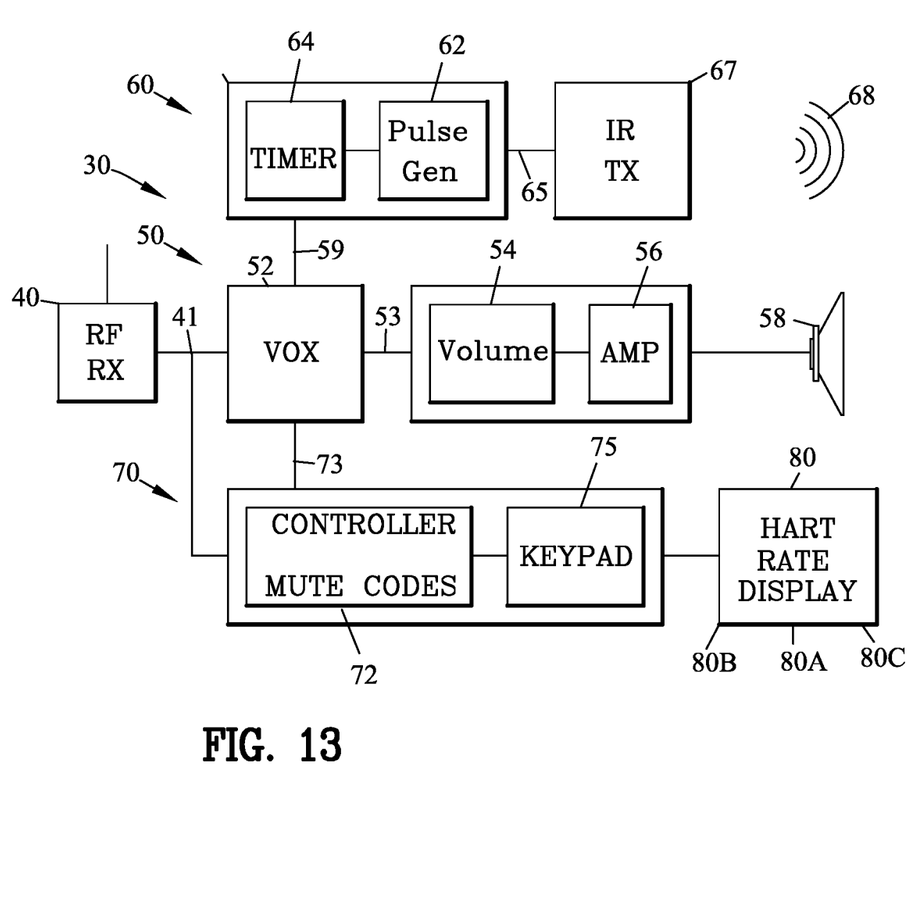
FIG. 13 is a detailed block diagram of the voiceover device of FIGS. 1-6.

FIG. 13 illustrates a more detailed view of the voiceover circuit 50 and the muting circuit 60 and the controller 70. The muting circuit 50 comprises a voice operated switch (VOX) 52 for providing an output 53 transmitting an audio signal above a preselected threshold of intensity. The voice operated switch (VOX) 52 eliminates low level audio inputs such as unintelligible voices and background noise. The output 53 of the voice operated switch (VOX) 52 contains intelligible audio information from the user 19 free from background noise.

Figure 10:
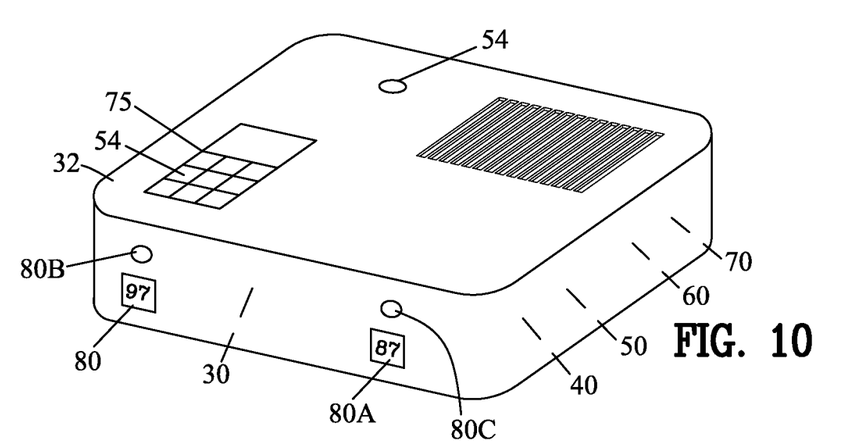
FIG. 10 is a front isometric view of the voiceover device of FIGS. 1-6.
Figure 11:
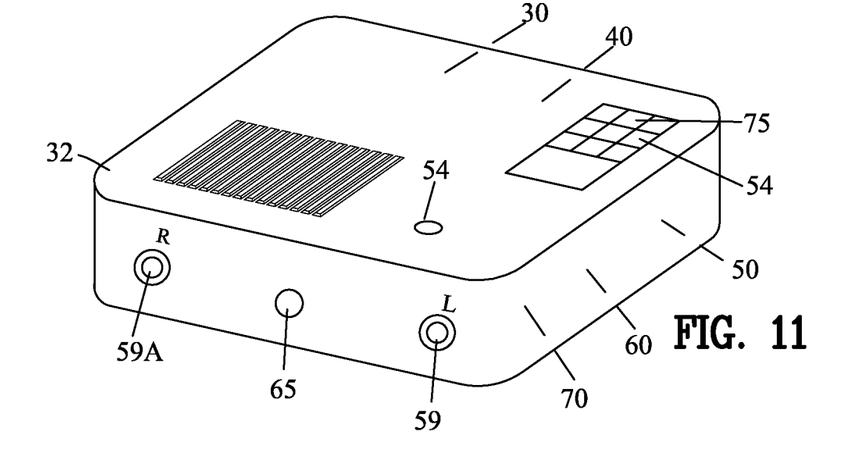
FIG. 11 is a rear isometric view of the voiceover device of FIGS. 1-6.

The output 53 of the voice operated switch (VOX) 52 is passed through a volume control 54 into an audio amplifier 56. Preferably, the volume control 54 is a mechanical control positioned on an exterior housing 32 of the processor 30 as shown in FIGS. 10 and 11.

The audio amplifier 56 drives a speaker 58 also shown in FIGS. 1-6. The voice over circuit 50 may be fashioned as a multi-channel circuit such that microphones 21 and 21A independently drive speakers 58 and 58A. Multi-channel circuits are well known to those skilled in the art and further explanation should not be required by those skilled in the electronic art.

The voice operated switch (VOX) 52 is connected to the muting circuit for 60 through connector 59. The muting circuit 60 comprises a mute pulse generator 62 including a timing circuit 64. The muting pulse generator 62 generates a mute pulse at a mute pulse output 65 upon receiving a signal from the voice operated switch (VOX) 52. The function of the timing circuit 64 will be described hereinafter with reference to the operation of the voiceover device 5.

An output 65 of the muting pulse generator 62 is connected to a mute pulse transmitter 67 for transmitting a mute pulse to the muting input 18 of the audio-visual device 10. Preferably, the mute pulse transmitter 67 transmits electromagnetic radiation 68 in the form of radio frequency transmission, ultrasonic transmission or infrared transmission to the muting input 18 of the audio-visual device 10. The mute pulse mutes the audio output 16 of the audio-visual device 10 enabling the audio information from the user 19 from the speakers 58 to substitute for the original audio output 16 of the audio-visual device 10.

The output 41 of the receiver 40 is applied to the controller 70. The controller 70 comprises a mute code memory 72 for programming the muting pulse generator 62 through connectors 73 and 59 to product a mute pulse compatible with the muting input 16 of the audio-visual device 10. The programming the muting pulse generator 62 may be accomplished by a keypad 75 located on the housing 32 of the processor 30 as best shown in FIGS. 10 and 11.

The controller 70 processes the output of the human pulse sensor 25C of the auxiliary input device 21C to provide a digital display of the heartbeat of the users 19 and 19A on the displays 80 and 80 shown in FIGS. 1-6 and 10. In this example, the heartbeat of the users 19 and 19A is shown on digital displays 80 and 80A. In the alternative, the heartbeat of the users 19 and 19A may be displayed as a flashing display having a flashing frequency representative of the heartbeat of the user 30 as best shown in FIGS. 10 and 11.

FIGS. 10 and 11 are enlarged front and rear views of a housing 32 shown in FIGS. 1-6 containing the processor 30. The receiver, 40, the voice over circuit 50, the muting circuit 60 and the controller 70 are located within the housing 32. The digital displays 80 and 80A are located on the front of the housing 32. The mute pulse transmitter 67 is located on the rear of the housing 32 for directing the mute pulse 68 to the muting input 18 of the audio-visual device 10.

Figure 14:
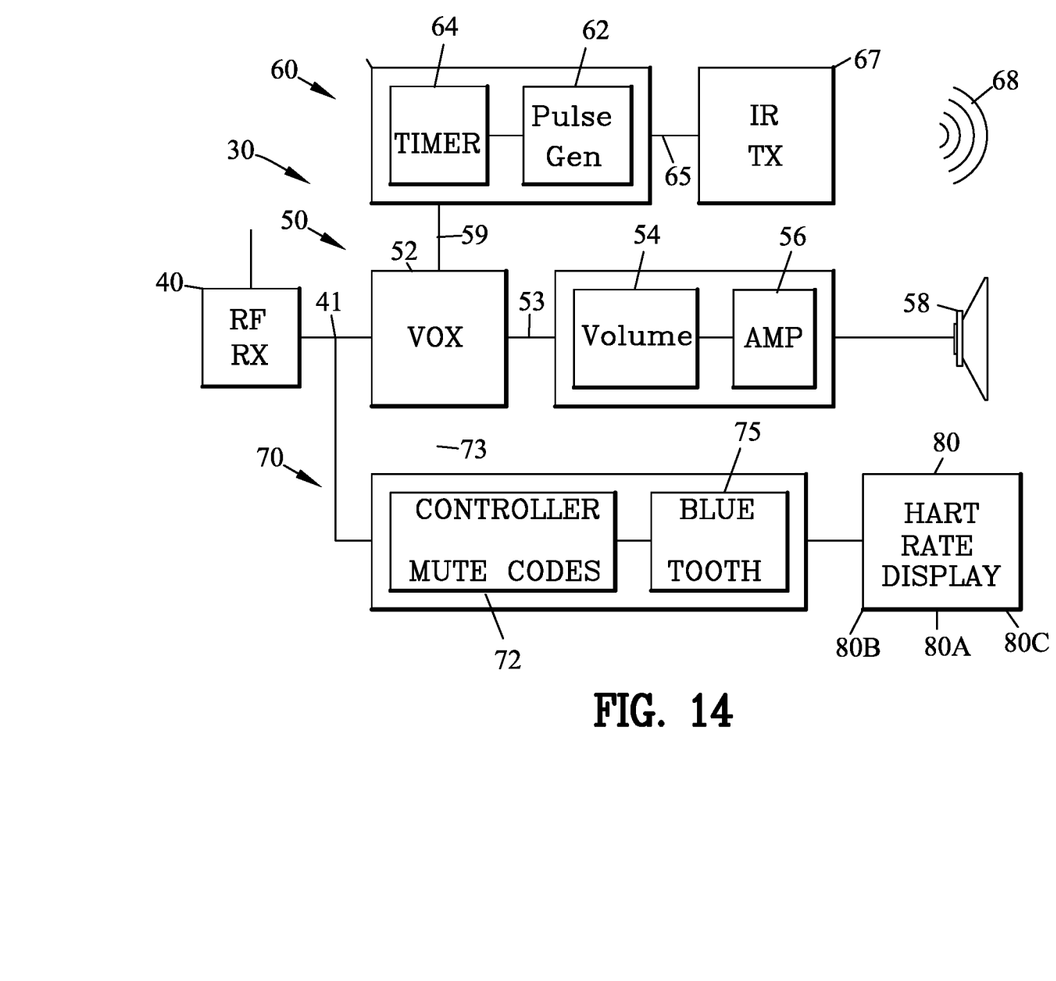
FIG. 14 is an alternate detailed block diagram of the voiceover device of FIGS. 1-6.

FIG. 14 is a view similar to FIG. 13 with an alternate controller 70A. In this embodiment, the mute code memory 72 of the controller 70 is programmed by a wireless receiver 75A though a remote wireless device (not shown). Various types of remote wireless device may be used including blue tooth devices such as cellular phones, tablets, computers and the like.

Figure 1:
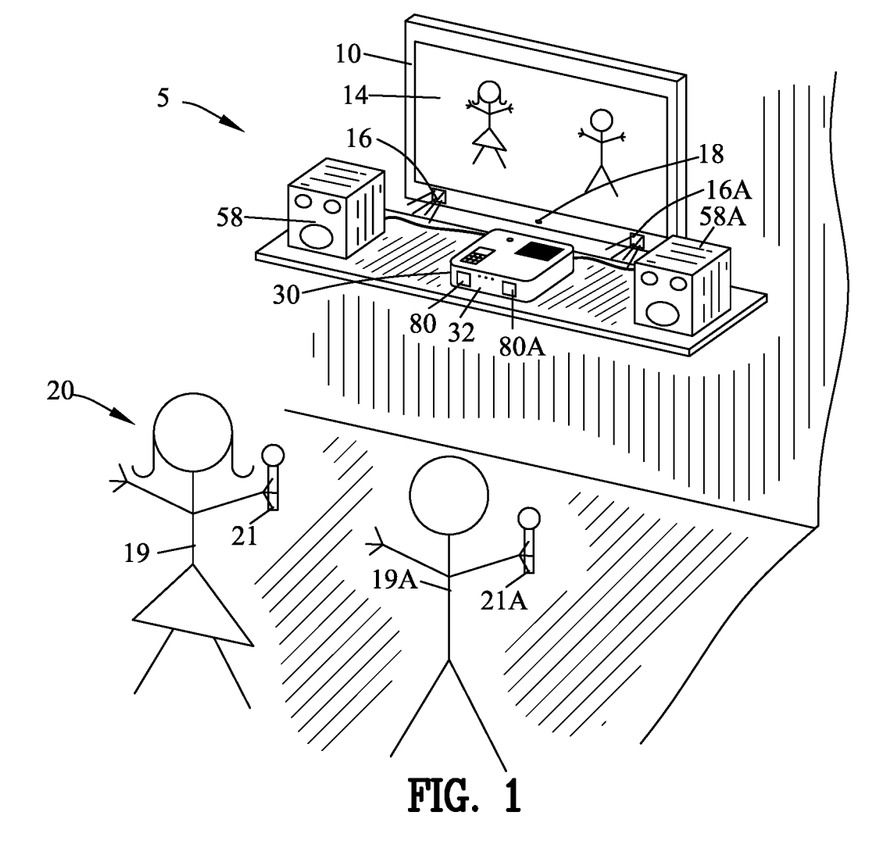
FIG. 1 is a view of a voiceover device of the present invention connected to a conventional display when no audio is detected by the microphone.
Figure 1A:
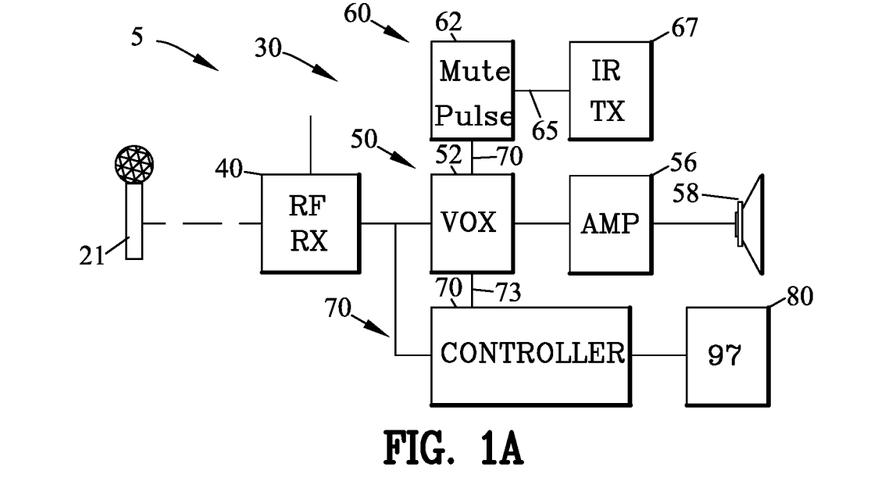
FIG. 1A is a block diagram for illustrating the operation of the voiceover device of FIG. 1.

FIGS. 1 and 1A illustrate the voiceover device 5 with the audio-visual device 10 operating in a normal condition. The original audio from the video program emanates from the audio outputs 18 and 18A. The heart-beat of the first player 19 and the heart beat of the second player 19A are displayed continuously on the heartbeat display 80 and 80A, respectively.

Figure 2:
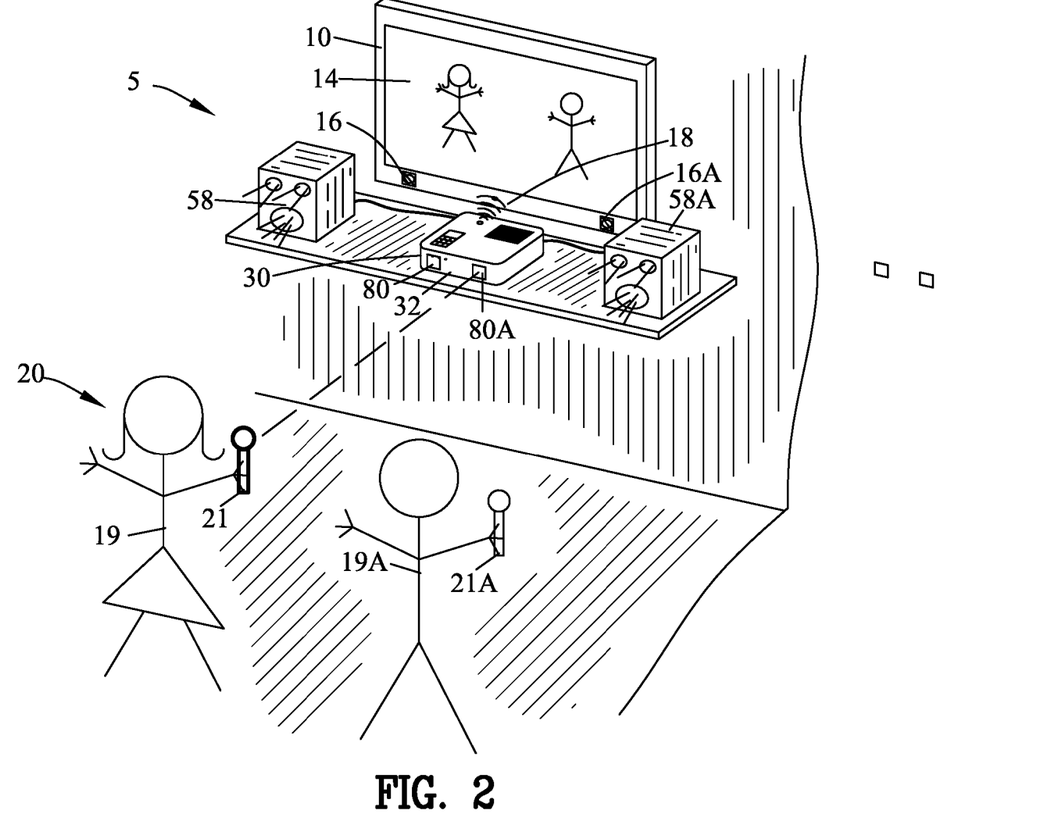
FIG. 2 is a view similar to FIG. 1 of a first microphone receiving audio information from a first player and transmitting the received audio information to the voiceover device.
Figure 2A:
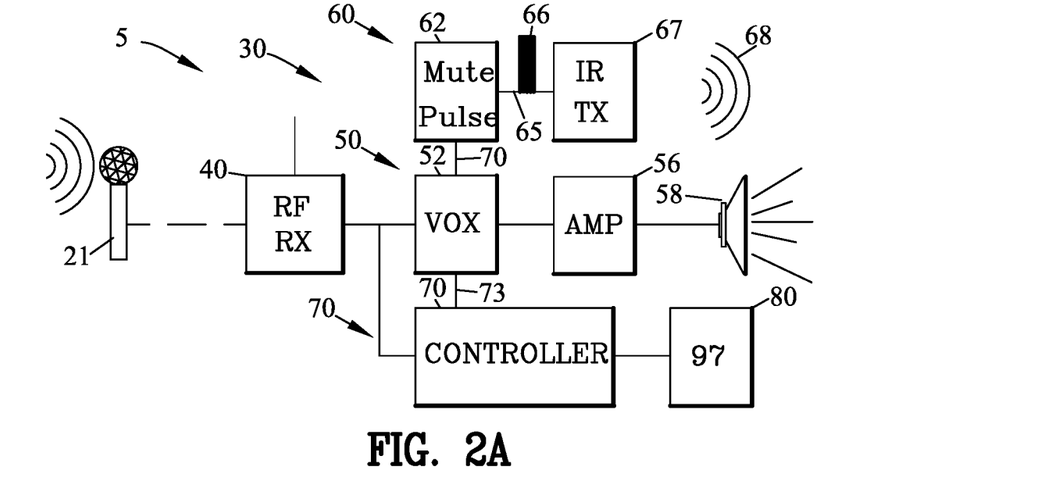
FIG. 2A is a block diagram for illustrating the operation of the voiceover device of FIG. 2.

FIGS. 2 and 2A illustrate the voiceover device 5 with the first microphone 21 receiving audio information from the first player 19 and transmitting the received audio information to the voiceover device 5 as indicated by the dashed line in FIG. 2. The received audio information in the voiceover device 5 generates the mute pulse 66 to actuate the muting transmitter 67 to mute the original audio from the audio outputs 18 and 18A. The audio information from the first player 19 is projected from the speaker 58 or both speaker 58 and 58A.

Figure 3:
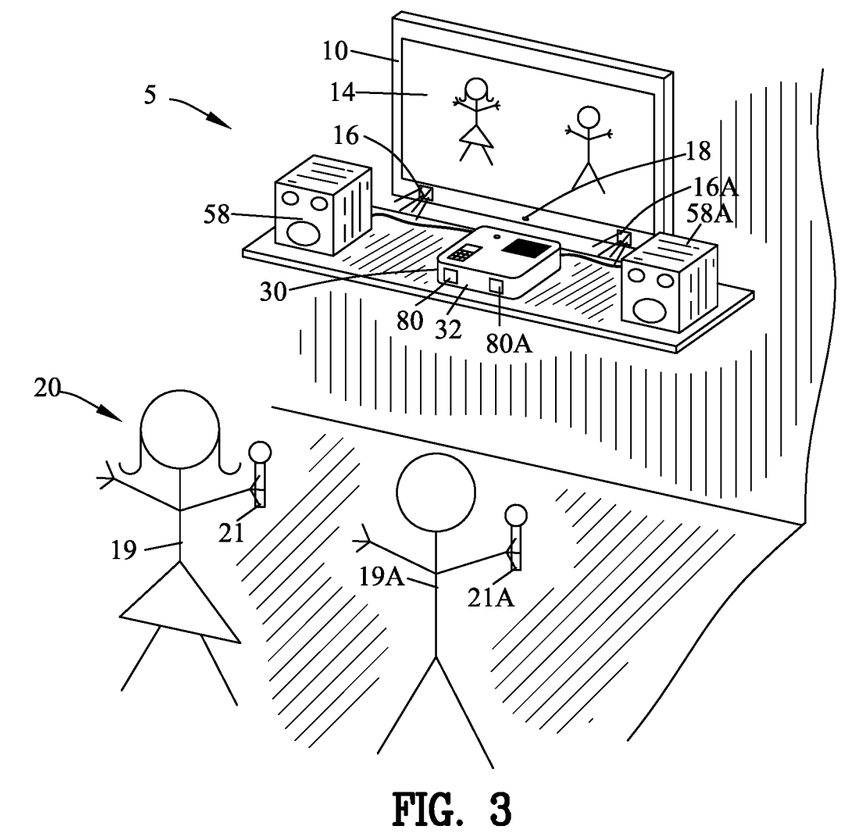
FIG. 3 is a view similar to FIG. 2 of a first microphone terminating audio information from a first player and transmitting no audio information to the voiceover device.
Figure 3A:
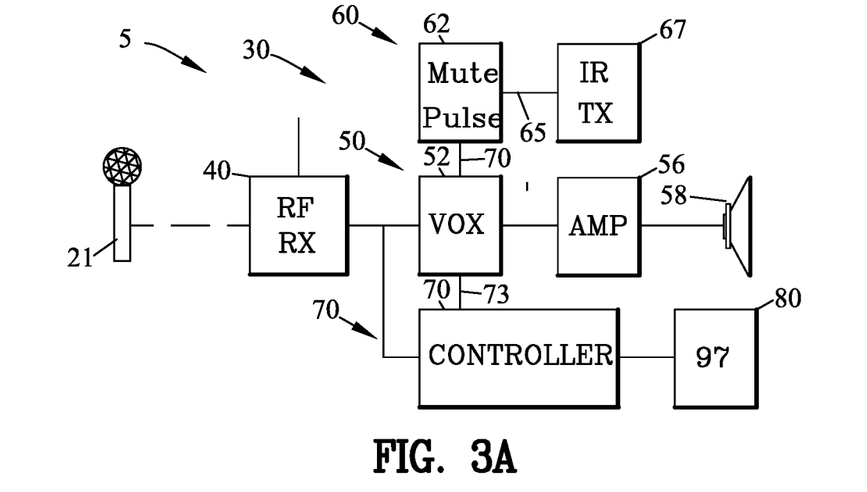
FIG. 3A is a block diagram for illustrating the operation of the voiceover device of FIG. 3.

FIGS. 3 and 3A illustrate the voiceover device 5 with the first microphone 21 transmitting no audio information to the voiceover device 5 as indicated by the lack of the dashed line in FIG. 2. The timing circuit 64 delays the termination of the mute pulse 66 for a preselected period of time. After the preselected of time, the mute pulse 66 is terminated and the original audio from the video program is restored to the audio outputs 18 and 18A.

Figure 4:
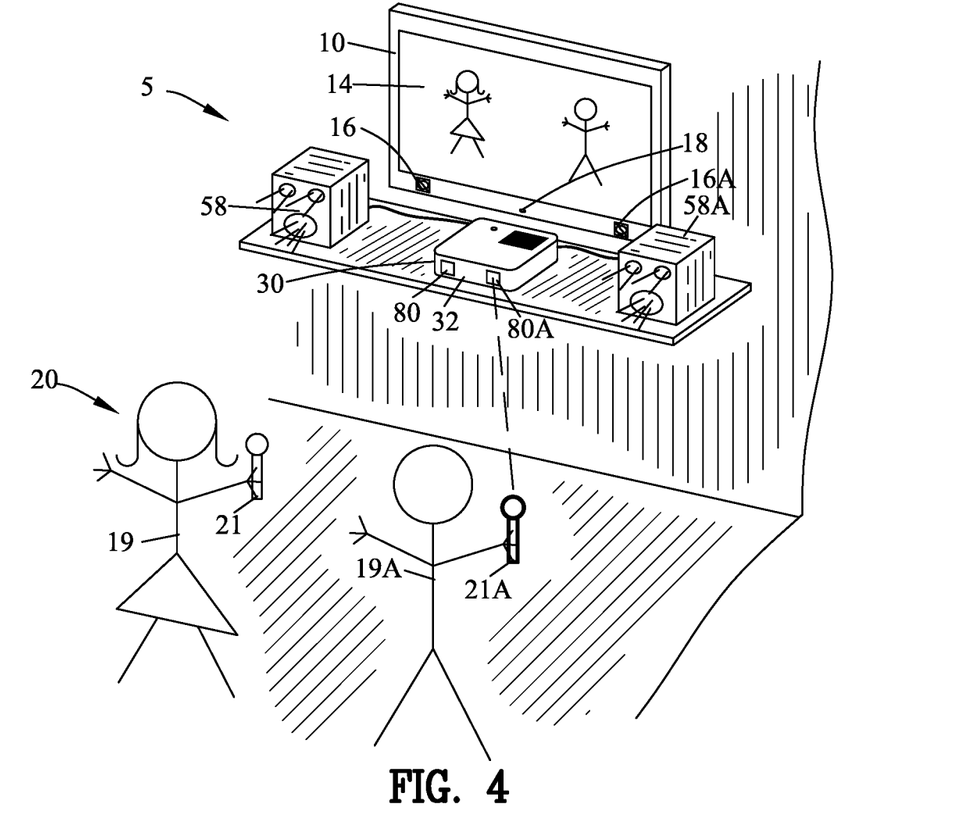
FIG. 4 is a view similar to FIG. 1 of the second microphone receiving audio information from a second player and transmitting the received audio information to the voiceover device.
Figure 4A:
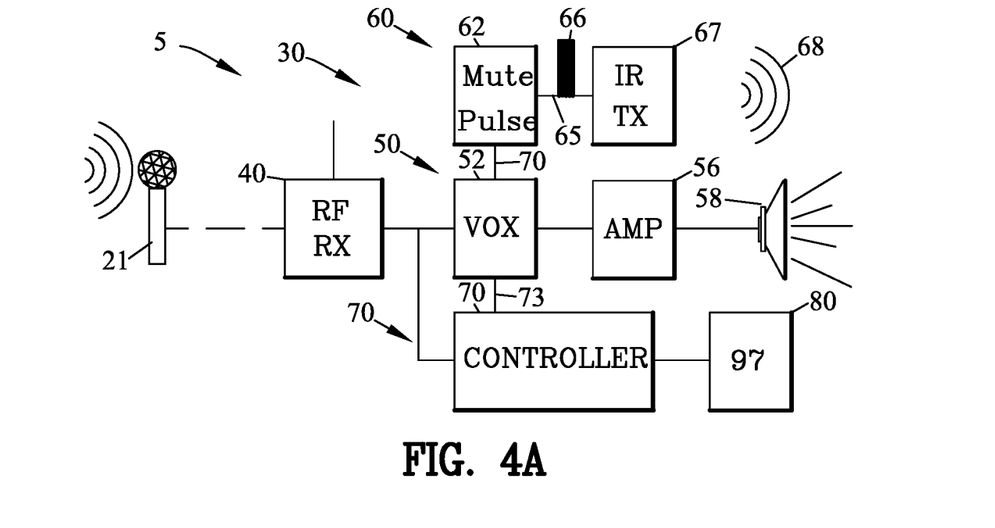
FIG. 4A is a block diagram for illustrating the operation of the voiceover device of FIG. 4.

FIGS. 4 and 4A illustrate the voiceover device 5 with the second microphone 21A receiving audio information from the second player 19A and transmitting the received audio information to the voiceover device 5 as indicated by the dashed line in FIG. 4. The received audio information in the voiceover device 5 generates the mute pulse 66 to actuate the muting transmitter 67 to mute the original audio from the audio outputs 18 and 18A. The audio information from the second player 19A is projected from the speaker 58A or both speaker 58 and 58A.

Figure 5A:
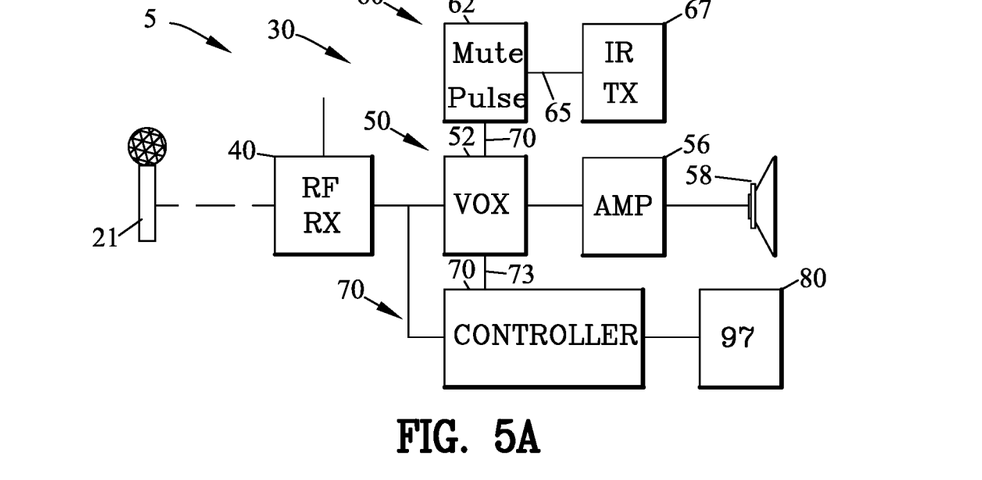
FIG. 5A is a block diagram for illustrating the operation of the voiceover device of FIG. 5.

FIGS. 5 and 5A illustrate the voiceover device 5 with the second microphone 21A transmitting no audio information to the voiceover device 5 as indicated by the lack of the dashed line in FIG. 4. The timing circuit 64 delays the termination of the mute pulse 66 for a preselected period of time. After the preselected of time, the mute pulse 66 is terminated and the original audio from the video program is restored to the audio outputs 18 and 18A.

Figure 6A:
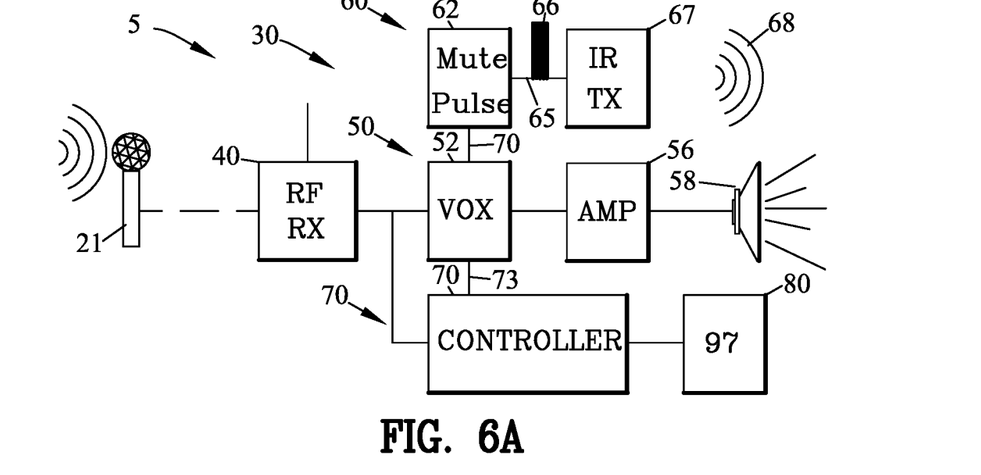
FIG. 6A is a block diagram for illustrating the operation of the voiceover device of FIG. 6.

FIGS. 6 and 6A illustrate the voiceover device 5 with both the first and the second microphones 21 and 21A receiving audio information from the first player 19 and transmitting the received audio information to the voiceover device 5 as indicated by the dashed lines in FIG. 6. The received audio information in the voiceover device 5 generates the mute pulse 66 to actuate the muting transmitter 67 to mute the original audio from the audio outputs 18 and 18A. The audio information from the first and second players 19 and 19A is projected from the speakers 58 and 58A, respectively, or both speaker 58 and 58A. After both the first and the second microphones 21 and 21A stop transmitting audio information and after the preselected of time, the mute pulse 66 is terminated and the original audio from the video program is restored to the audio outputs 18 and 18A.

The voiceover device 5 may be used in commercial applications, graphic arts applications as well as recreational applications. The recreational application of the voiceover device 5 may be used in any language and use by all age groups. The voiceover device 5 may find particular use in adult parties viewing adult and non-adult original video programming. The voiceover device 5 may find particular use in parties viewing news cast or controversial subject matter such as political debates.

In one example, two or more people are watching program such as a movie, news cast or controversial subject matter such as political debate. Each person verbally selects or is assigned the person or persons in the program they wish to speak as for the entire program. When a person speaks, the original audio of the program is cut off during the activation of the microphone. And as such the person or persons speaking will be heard out of the speakers while the audio of the original program muted. As soon as speech is stopped on the microphone the audio of the original program is restored.

In another example, we have all enjoyed watching a movie with one or more friends, or at a party, we have found our self making humorous statements as if this is what a person in the movie should really be saying. And of course other people chime in as if they were the other person. Obviously there are a lot of wisecracks and such.

It will be even more fun and comical if several people are involved, all who have been assigned to different actors in the movie. The people will be putting themselves, their feelings, their comments into the movie, whether it is drama, wit, or humor. The present apparatus enables everyone to be emotionally and actively involved. It becomes even more meaningful when the program is on a large screen home theater system with a sophisticated audio system.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A voiceover device for use with an audio-visual device having a video display and an audio output, comprising:
   an input device for receiving voiceover audio information from a user;
   said input device having a wireless input transmitter for transmitting said voiceover audio information;
   a receiver for receiving said voiceover audio information of the user from said wireless input transmitter;
   a voiceover circuit connected to said receiver comprising an amplifier for amplifying said voiceover audio information for driving a speaker;
   a muting circuit connected to said receiver for muting the audio output of the audio-visual device upon said receiver receiving a voiceover audio input from said input device to substitute the voiceover audio information from the user for the original audio output of the audio-video display; and
   said muting circuit being connected to said receiver through a voice operated switch (VOX) said for muting the audio output of the audio-visual device upon said receiver receiving a voiceover audio input from said input device to substitute the voiceover audio information from the user for the original audio output of the audio-video display.

2. A voiceover device as set forth in claim 1, wherein the audio-visual device is a television display.

3. A voiceover device as set forth in claim 1, wherein said input device comprises a microphone receiving the voiceover audio information from the user.

4. A voiceover device as set forth in claim 1, wherein said input device comprises a microphone headset receiving the voiceover audio information from the user.

5. A voiceover device as set forth in claim 1, wherein said input device comprises a plurality of microphones for enabling a plurality of users to enter voiceover audio information.

6. A voiceover device as set forth in claim 1, wherein said voiceover circuit includes a voice operated switch (VOX) for providing a voiceover circuit output upon receiving said voiceover audio information from the user from said wireless input transmitter.

7. A voiceover device as set forth in claim 1, wherein said muting circuit includes a muting output communicating with the audio-visual device for muting the audio portion of the audio-video display device.

8. A voiceover device for use with an audio-visual device having a video display and an audio output, comprising:
   an input device for receiving voiceover audio information from a user;
   said input device having a wireless input transmitter for transmitting said voiceover audio information;
   a receiver for receiving said voiceover audio information of the user from said wireless input transmitter;
   a voiceover circuit connected to said receiver comprising an amplifier for amplifying said voiceover audio information for driving a speaker;
   a muting circuit connected to said receiver for muting the audio output of the audio-visual device upon said receiver receiving a voiceover audio input from said input device to substitute the voiceover audio information from the user for the original audio output of the audio-video display;
   said muting circuit including a muting output communicating with the audio-visual device for muting the audio portion of the video display device; and
   said muting output includes a wireless communicating with the audio-visual device.

9. A voiceover device for use with an audio-visual device having a video display and an audio output, comprising:
   an input device for receiving voiceover audio information from a user;
   said input device having a wireless input transmitter for transmitting said voiceover audio information;
   a receiver for receiving said voiceover audio information of the user from said wireless input transmitter;
   a voiceover circuit connected to said receiver comprising an amplifier for amplifying said voiceover audio information for driving a speaker;
   a muting circuit connected to said receiver for muting the audio output of the audio-visual device upon said receiver receiving a voiceover audio input from said input device to substitute the voiceover audio information from the user for the original audio output of the audio-video display,
   said muting circuit including a muting output communicating with the audio-visual device for muting the audio portion of the audio-video display device; and
   said muting output includes an electromagnetic radiation communicating with the audio-visual device.

10. A voiceover device for use with an audio-visual device having a video display and an audio output, comprising:
    an input device for receiving voiceover audio information from a user;
    said input device having a wireless input transmitter for transmitting said voiceover audio information;
    a receiver for receiving said voiceover audio information of the user from said wireless input transmitter;
    a voiceover circuit connected to said receiver comprising an amplifier for amplifying said voiceover audio information for driving a speaker;
    a muting circuit connected to said receiver for muting the audio output of the audio-visual device upon said receiver receiving a voiceover audio input from said input device to substitute the voiceover audio information from the user for the original audio output of the audio-video display;

said input device including a heart beat sensor for monitoring the heart beat of an operator of the voiceover device; and a heart beat monitor for displaying a heartbeat of the user.

* * * * *